Patented Nov. 30, 1943

2,335,412

UNITED STATES PATENT OFFICE 2,335,412

CONDENSATION PRODUCTS OF THE ANTHRAQUINONE SERIES

Winfrid Hentrich, Dessau-Rosslau, and Heinz-Joachim Engelbrecht, Dessau, Germany; vested in the Alien Property Custodian No Drawing. Application March 6, 1940, Serial No. 322,552. In Germany February 23, 1939

5 Claims. (Cl. 260—372)

It has been found that new condensation-products of the anthraquinone series are obtainable by condensing 4-halogen-1-amino-anthraquinone-2-sulfonic acid or its alkali salts of the general formula

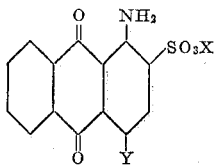

wherein X stands for hydrogen or for an alkali metal atom and Y for a halogen of the group chlorine, bromine and iodine with amino-aryl-alkyl-ketones of the following formula

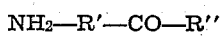

NH₂—R'—CO—R'' wherein R' represents a radical of the benzene series which may be halogenated, hydroxylated or alkylated and contain the NH₂-group in the radical R' in meta-position, and R'' stands for an alkyl residue which may still be halogenated or hydroxylated. The condensation is effected by heating up the components in the presence of water, an acid-binding agent such as sodium-carbonate and a little amount of a copper-compound e. g. cuprous chloride.

The same products are likewise obtained by the condensing of an amino-aryl-alkyl-ketone with a 1-amino-2,4-dihalogen-anthraquinone and by the exchanging of the halogen atom in the 1-amino-2-halogen-4-arylido-anthraquinone obtainable by condensation as above indicated, for a sulfonic acid group and preferably by a treatment with an alkali metal sulfite.

The new products are characterized by the following formula

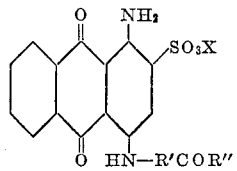

wherein X stands for hydrogen or for an alkali metal atom, whereas R' represents a radical of the benzene series in which the NH-group stands in meta-position, and R'' an alkyl residue. The new products are dyestuffs which dye wool and silk from an acid bath blue tints of very good fastness-properties. Moreover the new dyestuffs are of an excellent equalizing-power.

The following examples serve to illustrate the new invention but they are not intended to limit it thereto:

Example 1

101 parts by weight of 4-bromo-1-amino-anthraquinone-2-sulfonic acid sodium, 35 parts by weight of 3-amino-aceto-phenone, 20 of anhydrous sodium carbonate and 5 of cuprous chloride are heated up to 75–85° C. together with 600 parts by weight of water while well stirring and gradually raising the temperature. We maintain this temperature until the formation of dyestuff is finished. The working-up and purifying of the dyestuff is done according to usual methods. The thus obtained dyestuff is a blue crystalline powder dyeing wool and silk from an acid bath pure blue tints.

Instead of 3-amino-aceto-phenone we may likewise use 3-amino-propio-phenone, 3-amino-butyro-phenone, 2,4,6-tribromo-3-amino-aceto-phenone and 5-amino-2,4-dimethyl-aceto-phenone.

Example 2

76 parts by weight of 2,4-dibromo-1-amino-anthraquinone, 30 parts by weight of 3-amino-aceto-phenone, 40 of anhydrous potassium-acetate, 1.0 part by weight of copper-acetate, 1.0 of copper-bronze are heated in the autoclave for 18 hours up to about 150 to 160° C. in 750 parts by volume of amyl-alcohol while stirring. After cooling the isolated condensation-product is sucked off, then washed with alcohol and water and finally dried.

For the converting into the sulfonic acid 44 parts by weight of the condensation-product are heated at the reflux cooler up to a gentle boiling, together with 180 parts by weight of phenol, 40 of potassium sulfite and 100 of water, until the dyestuff becomes soluble in water. After removing the phenol by steam-distilling the reaction-mixture is filtered whereupon the thus formed dyestuff is separated from the filtrate in the usual manner.

Example 3

40 parts by weight of 4-bromo-1-amino-anthraquinone-2-sulfonic sodium, 18 parts of 3-amino-butyro-phenone, 8 of anhydrous sodium carbonate and 2 of cuprous chloride are heated together with 250 parts by weight of water while stirring and gradually warming up to 80–100° C. We maintain this temperature until the formation of dyestuff is finished, whereupon the dyestuff is worked up in the usual way. The isolated dyestuff dyes wool and silk from an acid bath beautiful blue tints.

What we claim is:

1. As a new product the compound of the formula

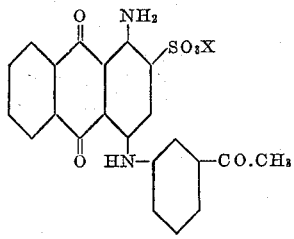

wherein X is selected from the group consisting of hydrogen and an alkali metal atom, this product forming a blue crystalline powder, which dyes wool blue tints fast to light and washing.

2. As a new product the compound of the formula:

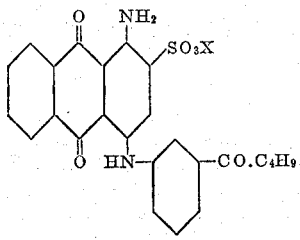

wherein X is selected from the group consisting of hydrogen and an alkali metal atom, this product forming a blue crystalline powder, which dyes wool blue tints fast to light and washing.

3. As a new product the compound of the formula:

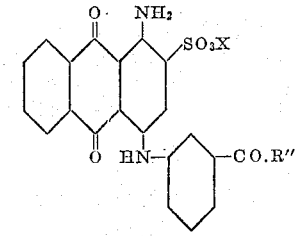

wherein X is selected from the group consisting of hydrogen and an alkali metal atom, and R'' is an unsubstituted alkyl radical of 1 to 4 carbon atoms, this product forming a blue crystalline powder, which dyes wool blue tints fast to light and washing.

4. As new products the compounds of the general formula:

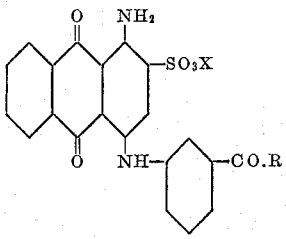

wherein X stands for one of the group consisting of hydrogen and an alkali metal atom and R is an aliphatic group containing not more than four carbon atoms and selected from the group consisting of an unsubstituted alkyl group, an alkyl group substituted by a halogen radical and an alkyl group substituted by a hydroxyl radical, these products forming crystalline powders which are dissolved in water to form a blue solution, dyeing wool and silk blue tints with good fastness-properties.

5. As new products the compounds of the general formula:

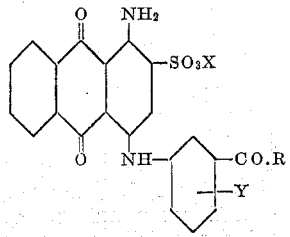

wherein X stands for one of the group consisting of hydrogen and an alkali metal atom, Y stands for one of the group consisting of hydrogen, an alkyl group, halogen and hydroxyl, and R is an aliphatic group containing not more than four carbon atoms selected from the group consisting of an unsubstituted alkyl group, an alkyl group substituted by a halogen radical and an alkyl group substituted by a hydroxyl radical, these products forming crystalline powders which are dissolved in water to form a blue solution, dyeing wool and silk blue tints with good fastness-properties.

WINFRID HENTRICH.
HEINZ-JOACHIM ENGELBRECHT.